(12) United States Patent
Hsu et al.

(10) Patent No.: US 9,769,677 B2
(45) Date of Patent: Sep. 19, 2017

(54) METHOD AND APPARATUS FOR BIT-ADAPTIVE PRECODING MATRIX INDICATOR FEEDBACK

(71) Applicant: Industrial Technology Research Institute, Hsinchu (TW)

(72) Inventors: Chao-Yuan Hsu, New Taipei (TW); Ren-Jr Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 587 days.

(21) Appl. No.: 13/727,607

(22) Filed: Dec. 27, 2012

(65) Prior Publication Data

US 2014/0003395 A1     Jan. 2, 2014

Related U.S. Application Data

(60) Provisional application No. 61/667,397, filed on Jul. 2, 2012.

(51) Int. Cl.
*H04W 24/02* (2009.01)
*H04B 7/04* (2017.01)
*H04B 7/06* (2006.01)

(52) U.S. Cl.
CPC .......... *H04W 24/02* (2013.01); *H04B 7/0478* (2013.01); *H04B 7/0639* (2013.01); *H04B 7/0641* (2013.01); *H04B 7/0654* (2013.01)

(58) Field of Classification Search
None
See application file for complete search history.

(56) References Cited

U.S. PATENT DOCUMENTS 7,006,798 B2    2/2006  Miyoshi et al.
7,817,739 B2 *  10/2010 Wennstrom et al. ......... 375/260
(Continued)

FOREIGN PATENT DOCUMENTS

CN    101682382    3/2010
CN    101984572    3/2011
(Continued)

OTHER PUBLICATIONS

Love et al., "Grassmannian Beamforming for Multiple-Input Multiple-Output Wireless Systems," IEEE Transactions on Information Theory 49(10), Oct. 2003, pp. 2735-2747.
(Continued)

*Primary Examiner* — Christopher Crutchfield
*Assistant Examiner* — Tito Pham
(74) *Attorney, Agent, or Firm* — Jianq Chyun IP Office

(57) ABSTRACT

A method and apparatus for performing precoding matrix indicator (PMI) feedback are provided. The apparatus may include at least one storage device containing a computer program, at least one processing circuit and related control/computing devices. The at least one processing circuit is configured with at least one storage device and computer program to feed back the selected PMI and to receive related signalings of the PMI feedback method. One of the signalings includes the precoder candidate set configuration which defines the subset of precoders in a codebook for each precoder to report PMI next time. The selected PMI is transmitted by the apparatus to the corresponding communication device in the communication network.

8 Claims, 18 Drawing Sheets

(56) References Cited

U.S. PATENT DOCUMENTS

| | | | |
|---|---|---|---|
| 8,160,125 B2* | 4/2012 | Clerckx et al. | 375/219 |
| 8,199,853 B2* | 6/2012 | Kim et al. | 375/299 |
| 2009/0080549 A1* | 3/2009 | Khan et al. | 375/260 |
| 2011/0069653 A1* | 3/2011 | Wang et al. | 370/312 |
| 2011/0142000 A1* | 6/2011 | Han et al. | 370/329 |
| 2011/0164701 A1* | 7/2011 | Nikopourdeilami et al. | 375/295 |
| 2011/0243098 A1* | 10/2011 | Koivisto et al. | 370/335 |
| 2012/0082190 A1* | 4/2012 | Zhu et al. | 375/219 |
| 2012/0294204 A1* | 11/2012 | Chen | H04L 5/0053 370/280 |
| 2013/0242860 A1* | 9/2013 | Kim et al. | 370/328 |

FOREIGN PATENT DOCUMENTS

| | | |
|---|---|---|
| CN | 102148663 | 8/2011 |
| EP | 2169845 | 3/2010 |
| TW | 201021434 | 6/2010 |

OTHER PUBLICATIONS

Love et al., "Limited Feedback Unitary Precoding for Spatial Multiplexing Systems," IEEE Transactions on Information Theory 51(8), Aug. 2005, pp. 2967-2976.

Hochwald et al., "Systematic Design of Unitary Space-Time Constellations," IEEE Transactions on Information Theory 46(6), Sep. 2000, pp. 1962-1973.

Li et al, "Differential Precoding Scheme of LTE Systems over Temporally Correlated Channels," 2011 IEEE Vehicular Technology Conference (VTC Fall), Sep. 5-8, 2011, pp. 1-5.

Kim et al., "Differential Rotation Feedback MIMO System for Temporally Correlated Channels," IEEE Global Telecommunications Conference (IEEE GLOBECOM 2008), Nov. 30, 2008-Dec. 4, 2008, pp. 1-5.

Abe et al., "Differential Codebook MIMO Precoding Technique," IEEE Global Telecommunications Conference (GLOBECOM '07), Nov. 26-30, 2007, pp. 3963-3968.

Wang et al., "Reducing Signalling Overhead by an Enhanced Differential Codebook in Multimode MIMO-OFDM Systems," IEEE 72nd Vehicular Technology Conference, Sep. 6, 2010, pp. 1-6.

"Search Report of Europe Counterpart Application", issued on Oct. 28, 2013, p. 1-p. 10.

"Office Action of Taiwan Counterpart Application", issued on Oct. 27, 2014, p. 1-p. 8.

"Office Action of China Counterpart Application", issued on Feb. 3, 2016, p. 1-p. 10.

* cited by examiner

| Codebook index | $u_n$ | Number of layers $\nu$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1234\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Figure. 2

| Current precoder index | Next precoder candidates (3 bits) |
|---|---|
| 0 | 0,9,11,4,7,12,13,14 |
| 1 | 1,8,10,4,5,12,13,14 |
| 2 | 2,9,11,5,6,12,13,14 |
| 3 | 3,8,10,6,7,12,13,14 |
| 4 | 4,0,1,8,9,12,15,2 |
| 5 | 5,1,2,9,10,13,14,0 |
| 6 | 6,2,3,10,11,13,14,0 |
| 7 | 7,0,3,8,11,12,15,1 |
| 8 | 8,1,3,4,7,12,13,14 |
| 9 | 9,0,2,4,5,12,13,14 |
| 10 | 10,1,3,5,6,12,13,14 |
| 11 | 11,0,2,6,7,12,13,14 |
| 12 | 12,4,7,0,1,2,3,8 |
| 13 | 13,5,6,0,1,2,3,8 |
| 14 | 14,5,6,0,1,2,3,8 |
| 15 | 15,4,7,0,1,2,3,8 |

| Bits (3 bits) | Precoder index | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 000 | 0 | 1 | 2 | 3 | 4 | 5 | 6 | 7 | 8 | 9 | 10 | 11 | 12 | 13 | 14 | 15 |
| 001 | 9 | 8 | 9 | 8 | 0 | 1 | 2 | 0 | 1 | 0 | 1 | 0 | 4 | 5 | 14 | 15 |
| 010 | 11 | 10 | 11 | 10 | 1 | 2 | 3 | 3 | 3 | 2 | 3 | 2 | 7 | 6 | 5 | 4 |
| 011 | 4 | 4 | 5 | 6 | 8 | 9 | 10 | 8 | 4 | 4 | 5 | 6 | 0 | 0 | 0 | 7 |
| 100 | 7 | 5 | 6 | 7 | 9 | 10 | 11 | 11 | 7 | 5 | 6 | 7 | 1 | 1 | 1 | 0 |
| 101 | 12 | 12 | 12 | 12 | 12 | 13 | 13 | 12 | 12 | 12 | 12 | 12 | 2 | 2 | 2 | 1 |
| 110 | 13 | 13 | 13 | 13 | 15 | 14 | 14 | 15 | 13 | 13 | 13 | 13 | 3 | 3 | 3 | 2 |
| 111 | 14 | 14 | 14 | 14 | 2 | 0 | 0 | 1 | 14 | 14 | 14 | 8 | 8 | 8 | 8 | 3 |

| Bits (2 bits) | Precoder index | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 00 | 0 | 1 | 2 | 3 | 4 | 5 | 6 | 7 | 8 | 9 | 10 | 11 | 12 | 13 | 14 | 15 |
| 01 | 9 | 8 | 9 | 8 | 0 | 1 | 2 | 0 | 1 | 0 | 1 | 0 | 4 | 5 | 5 | 4 |
| 10 | 11 | 10 | 11 | 10 | 1 | 2 | 3 | 3 | 3 | 2 | 3 | 2 | 7 | 6 | 6 | 7 |
| 11 | 4 | 4 | 5 | 6 | 8 | 9 | 10 | 8 | 4 | 4 | 5 | 6 | 0 | 0 | 0 | 0 |

Figure. 4C

| Bits (1 bit) | Precoder index | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 1 | 2 | 3 | 4 | 5 | 6 | 7 | 8 | 9 | 10 | 11 | 12 | 13 | 14 | 15 |
| 1 | 9 | 8 | 9 | 8 | 0 | 1 | 2 | 0 | 1 | 0 | 1 | 0 | 4 | 5 | 5 | 4 |

Figure. 4D

| Current precoder index | Next precoder candidates (3,4 bits) |
|---|---|
| 0 | 9,4,7,12,13,15,5,6 |
| 1 | All 16 precoders |
| 2 | 9,5,6,12,13,15,4,7 |
| 3 | All 16 precoders |
| 4 | 0,8,9,12,15,3,10,11 |
| 5 | All 16 precoders |
| 6 | 2,10,11,13,14,1,8,9 |
| 7 | All 16 precoders |
| 8 | 1,4,7,12,13,15,5,6 |
| 9 | All 16 precoders |
| 10 | 1,5,6,12,13,15,4,7 |
| 11 | All 16 precoders |
| 12 | 4,0,1,2,3,9,10,11 |
| 13 | All 16 precoders |
| 14 | 5,0,1,2,3,9,10,11 |
| 15 | All 16 precoders |

Figure. 7A

| Current precoder index | Next precoder candidates (3 bits) |
|---|---|
| 0 | 9,4,7,12,13,15,5,6 |
| 1 | 8,4,5,12,13,15,6,7 |
| 2 | 9,5,6,12,13,15,4,7 |
| 3 | 8,6,7,12,13,15,4,5 |
| 4 | 0,8,9,12,15,3,10,11 |
| 5 | 1,9,10,13,14,3,8,11 |
| 6 | 2,10,11,13,14,1,8,9 |
| 7 | 0,8,11,12,15,2,9,10 |
| 8 | 1,4,7,12,13,15,5,6 |
| 9 | 0,4,5,12,13,15,6,7 |
| 10 | 1,5,6,12,13,15,4,7 |
| 11 | 0,6,7,12,13,15,4,5 |
| 12 | 4,0,1,2,3,9,10,11 |
| 13 | 5,0,1,2,3,9,10,11 |
| 14 | 5,0,1,2,3,9,10,11 |
| 15 | 4,0,1,2,3,9,10,11 |

Figure. 10

METHOD AND APPARATUS FOR BIT-ADAPTIVE PRECODING MATRIX INDICATOR FEEDBACK

CROSS REFERENCE TO RELATED APPLICATION

This application claims the priority benefit of U.S. provisional application Ser. No. 61/667,397, filed on Jul. 2, 2012. The entirety of the above-mentioned patent application is hereby incorporated by reference herein and made a part of this specification.

BACKGROUND

Technical Field

The present disclosure generally relates to a method for performing a closed-loop bit adaptive precoding matrix indicator feedback mechanism and an apparatus using the same.

Related Art

The Multiple-Input multiple-output (MIMO) technique has been proved to be a successful approach to enhance capacity of single input single output (SISO) systems. For an $N_R \times N_T$ MIMO system, the system capacity asymptotically increases linearly with a slope that is equal to the minimum of $N_R$ and $N_T$, where $N_R$ is the number of receive antennas and $N_T$ is the number of transmit antennas. In addition to the capacity gain, the MIMO technique also could provide a maximum diversity gain that is equal to $N_T \times N_R$. This MIMO technique is now entering the 4th generation wireless cellular and wireless LAN products.

These MIMO gains are realizable when the corresponding receiver of a transmitter also knows the MIMO wireless channel. If the transmitter knows the wireless MIMO channel, system performance could be further improved by using signal processing techniques. One of these techniques is precoding. Precoding is to transform transmitted data before sending the data through antennas. Precoding could be classified as linear and non-linear precoding. Non-linear precoding techniques include dirty paper coding (DPC), Tomlinson-Harashima precoding (THP), etc. Linear precoding transforms data by multiplying the data with a precoding matrix to match the channel eigenmodes. Linear precoding is simple to implement in a system in which the system performance is easier to analyze than a system with non-linear precoding. For these reasons, linear precoding has been adopted in communication standards such as 3GPP long term evolution (LTE) and LTE-advanced (LTE-A). Thus linear precoding is expected to dominate future implementations of telecommunications networks. Linear precoding could also be applied to enhance capacity, which is called interference alignment.

There are two kinds of design approaches to implement linear precoding. One such approach is a codebook-based precoding; the other is a non-codebook-based precoding. Basically, the non-codebook-based precoding has better performance than the codebook-based precoding since the non-codebook-based precoding requires instantaneous channel state information (CSI) to design the best precoder for the moment. For a frequency-division duplexing (FDD) system, uplink (UL) signals need extra bandwidths to feed back CSI from a receiver to a transmitter for performing downlink (DL) precoding since the downlink and uplink channels are allocated in different frequency bands. In this way, the feedback overhead of CSI is high if full channel information is needed in order to feed back CSI from the receiver to the transmitter.

Codebook-based precoding could reduce the signal feedback overhead. There is a trade-off between system performance and signal feedback overhead. The optimum codebook-based approach basically follows the guideline of Grassmannian packing. The codebook design is irrelevant to instantaneous wireless channels. The codebook is designed by maximizing the minimum distance of any two codewords (precoder) in a codebook. For fast codebook design, DFT-based codebook design could be used. Owing to this kind of CSI-independent design, we may not need to feed back CSI. Since the codebook is designed regardless of instantaneous channels, the codebook could be designed off-line and stored in both the transmitters and receivers. In this way, a receiver only has to feed back the precoding matrix indicator (PMI) in a codebook to indicate which precoder the transmitter should use. Since the performance of codebook-based precoding is limited by the pre-designed codebook, some works have been focusing on adaptive codebook designs in order to further improve the system performance. An adaptive design approach could improve the system performance by requiring the codebook to make adaptive changes based on channel statistics such as channel spatial correlation and channel temporal correlation. Extra information of channel statistics must be fed back to a transmitter to update the current codebook. Thus, extra computing power could also be required to perform codebook updates. The codebook could be changed according to antenna settings such as uncorrelated or diversity setting, cross-polarized setting, and uniform linear array setting. These above-mentioned methods are different from the approach in the Standard LTE-A, which uses a fixed codebook under a certain configuration.

Coordinated Multipoint Transmission (CoMP) is a new technology to increase data transmission rate in LTE. By coordinating and combining signals from multiple base stations (e.g. transmission points or eNBs in LTE), CoMP could enable mobile users to enjoy consistent performance and quality regardless whether the mobile users are close to the center of a cell or are at a cell boundary. Since the number of eNBs is greater in CoMP scenarios, the number of feedback bits for PMI will become larger. In addition, when feedback timing of each transmission point collides, the feedback format designed in the current specification may not support such larger number of feedback bits for many transmission points at the same time. Thus, designing a flexible and efficient PMI feedback mechanism has become a major issue.

SUMMARY OF THE DISCLOSURE

Accordingly, the present disclosure is directed to a method for performing a bit adaptive precoding matrix indicator feedback mechanism and an apparatus using the same.

The present disclosure directs to a method for performing bit adaptive precoding matrix indicator (PMI) feedbacks, for use by an eNodeB (eNB), and the method includes at least the steps of receiving a PMI bit sequence, mapping the PMI bit sequence into a first precoder based on a bit mapping table and a reference precoder, determining the next precoder by referencing the first precoder, and processing the downlink data using the next precoder.

The present disclosure directs to a method for performing bit adaptive precoding matrix indicator (PMI) feedbacks at a user equipment (UE) and the method includes at least the steps of selecting a first precoder based on a signal, mapping the first precoder into a first PMI bit sequence based on a bit mapping table and a reference PMI, and transmitting the first PMI bit sequence.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 2 illustrates the codebook for four antennas in accordance with the LTE-A standard.

FIG. 4A illustrates a candidate set table listing uniform precoder candidates for each precoder in a codebook of LTE-A with the number of layers set to one in accordance with one of the exemplary embodiments of the present disclosure.

FIG. 4B illustrates a three-bit mapping table for each precoder candidate set in accordance with one of the exemplary embodiments of the present disclosure.

FIG. 4C illustrates a two-bit mapping table for each precoder candidate set in accordance with one of the exemplary embodiments of the present disclosure.

FIG. 4D illustrates a one-bit mapping table for each precoder candidate set in accordance with one of the exemplary embodiments of the present disclosure.

FIG. 7A illustrates non-uniform precoder candidates for each precoder in a codebook of LTE-A with the number of layers set to one in accordance with one of the exemplary embodiments of the present disclosure.

FIG. 10 illustrates uniform precoder candidates for each precoder in a codebook of LTE-A with the number of layers set to one used for an experiment.

DETAILED DESCRIPTION OF DISCLOSED EMBODIMENTS

In this present disclosure, a method and an apparatus to implement a PMI feedback mechanism with reduced signal feedback overhead by using a fixed codebook are proposed. The method and apparatus could be applied to single-user MIMO (SU-MIMO), multi-user MIMO (MU-MIMO), carrier aggregation (CA), and CoMP scenarios.

Figure 1A:
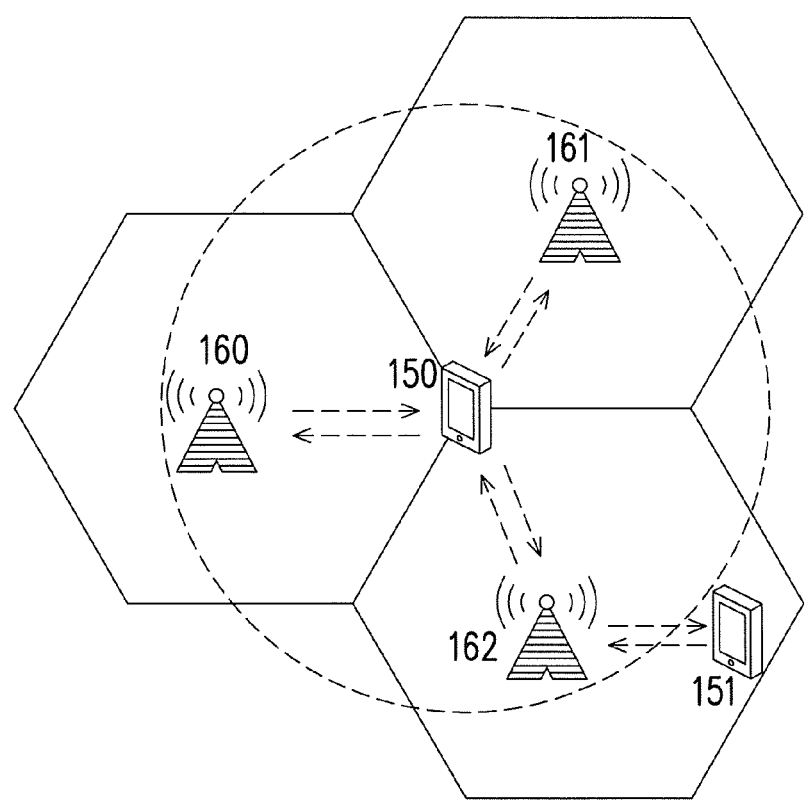
FIG. 1A illustrates an example of a communication system in accordance with an exemplary embodiment of the present disclosure.

FIG. 1A illustrates an example of a communication system in accordance with an exemplary embodiment of the present disclosure. The communication system could include at least but not limited to a plurality of eNBs with each eNB serving a plurality of UEs in accordance with a communication standard. In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art. One of the possible uses of the present disclosure according to FIG. 1A could include a UE 150 served by a group of eNBs 160, 161, and 162 or a UE 151 served only by an eNB 162.

The term "eNodeB" (eNB) in this disclosure may be, for example, a base station (BS), a Node-B, an advanced base station (ABS), a base transceiver system (BTS), an access point, a home base station, a relay station, a scatterer, a repeater, an intermediate node, an intermediary, satellite-based communication base stations, and so forth.

Figure 1B:
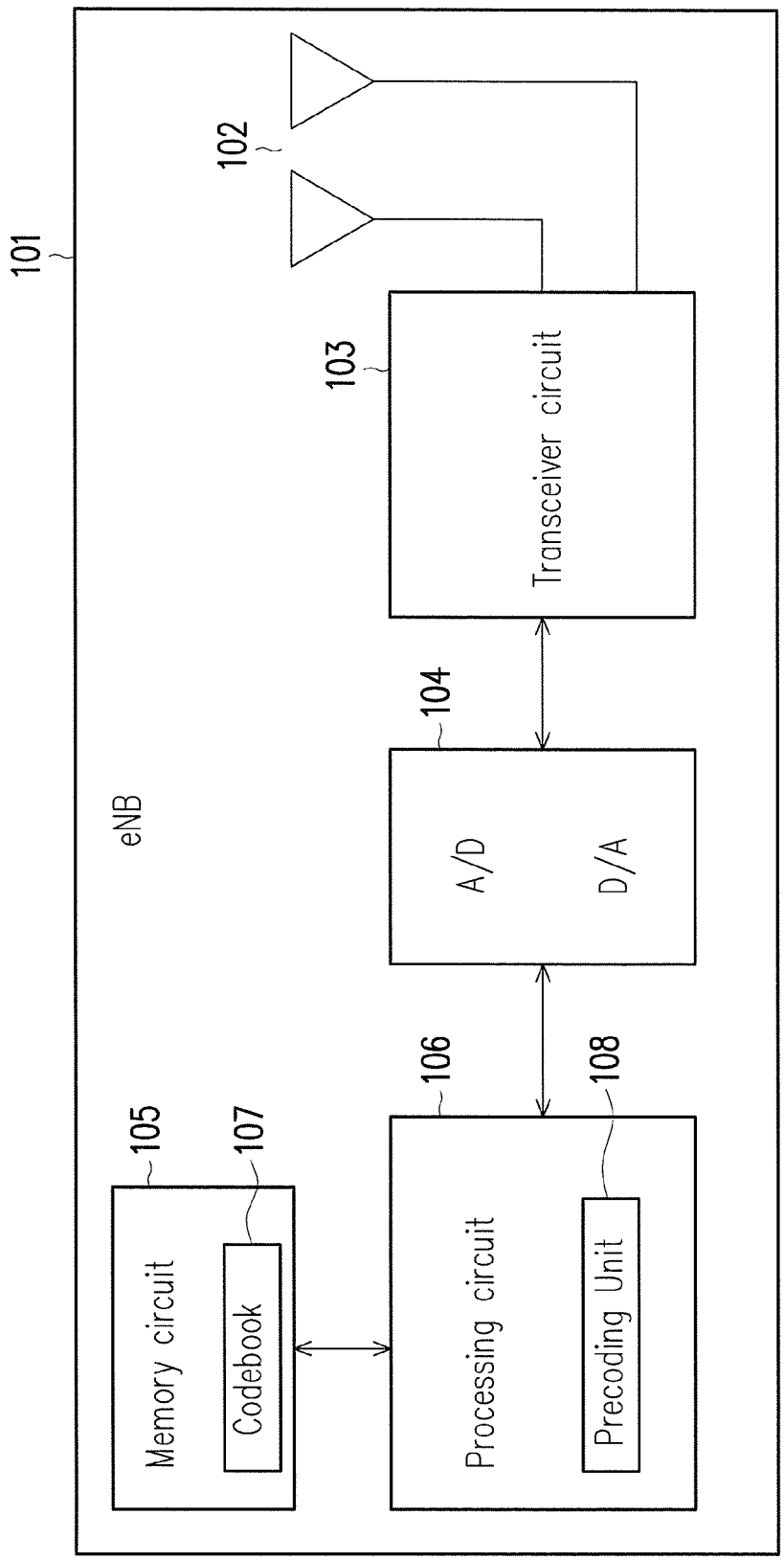
FIG. 1B is an example of an eNodeB (eNB) in accordance with an exemplary embodiment of the present disclosure.

FIG. 1B is an example of an eNodeB (eNB) functional block diagram in accordance with an exemplary embodiment of the present disclosure. Each eNB 101 of the communication system may contain at least but not limited to a transceiver circuit 103, an analog-to-digital (A/D)/digital-to-analog (D/A) converter 104, a processing circuit 106, a memory circuit 105, and one or more antenna units 102. The transceiver circuit (103) transmits downlink signals and receives uplink signals wirelessly. The transceiver circuit (103) may also perform operations such as low noise amplifying, impedance matching, frequency mixing, up or down frequency conversion, filtering, amplifying, and so like. The analog-to-digital (A/D)/digital-to-analog (D/A) converter (104) is configured to convert from an analog signal format to a digital signal format during uplink signal processing and from a digital signal format to an analog signal format during downlink signal processing.

The processing circuit 106 is configured to process digital signal and to perform procedures of the proposed method for bit adaptive precoding matrix indicator feedback mechanism in accordance with exemplary embodiments of the present disclosure. Also, the processing circuit 106 may access to a memory circuit 105 which stores programming codes, codebook configurations, buffered data, or record configurations assigned by the processing circuit 106. The functions of the processing circuit 106 may be implemented using programmable units such as a micro-processor, a micro-controller, a DSP chips, FPGA, etc. The functions of the processing circuit 106 may also be implemented with separate electronic devices or ICs. The processing circuit also includes a precoding unit 108 for implementing the bit adaptive precoding matrix indicator feedback mechanism in accordance with exemplary embodiments of the present disclosure. It should be noted that the precoding unit 108 may be implemented with either hardware or software.

The term "user equipment" (UE) in this disclosure may be, for example, a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and the like. In some applications, a UE may be a fixed computer device operating in a mobile environment, such as a bus, a train, an airplane, a boat, a car, and so forth.

Figure 1C:
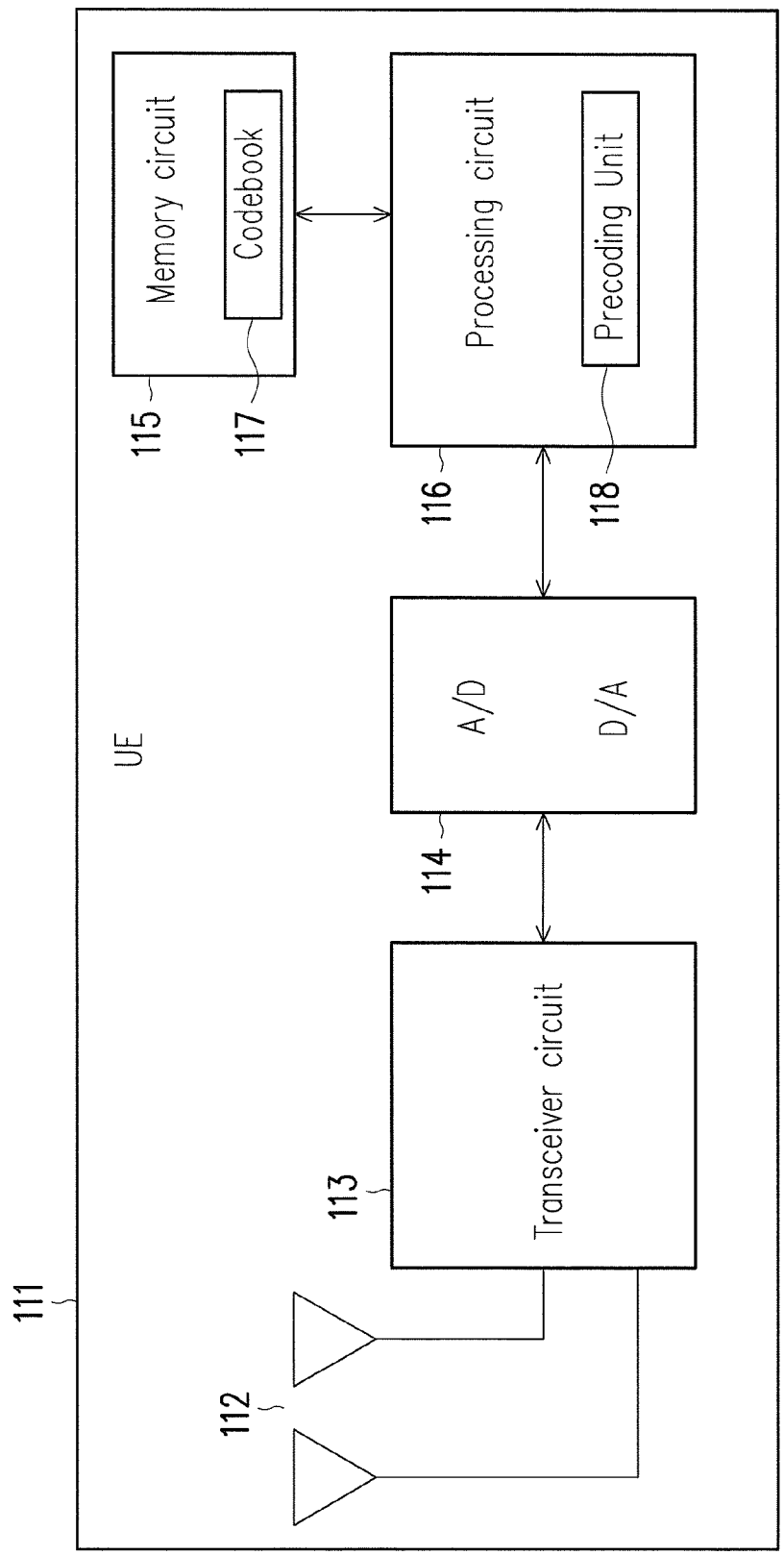
FIG. 1C is an example of a user equipment (UE) in accordance with an exemplary embodiment of the present disclosure.

FIG. 1C is an example of a UE 111 functional block diagram in accordance with an exemplary embodiment of the present disclosure. Each UE 111 of the communication system may contain at least but not limited to a transceiver circuit 113, an analog-to-digital (A/D)/digital-to-analog (D/A) converter 114, a processing circuit 116, a memory circuit 115, and one or more antenna units 112. The memory circuit 115 may store programming codes, buffer data, and a configured codebook 117. The processing circuit 116 may further include a precoding unit 118. The function of each element of a UE 111 is similar to an eNB 101 and therefore detailed descriptions for each element will not be repeated.

For communication systems that are of the LTE variants, an eNB may select downlink transmission configurations and related parameters depending on the current downlink channel conditions. To limit the data transmissions on both uplink and downlink to only a limited set of precoder matrices, a codebook may be defined for each transmission rank for a given number of antenna ports and stored in both an eNB and a UE so that only the index of the selected matrix or the PMI needs to be signalled.

FIG. 2 illustrates the codebook for four antennas in accordance with the LTE-A standard. The codebook contains 16 PMIs numbered from 0 to 15, and precoder tables for each number of layers. For each precoder $W_n^{\{S\}}$, it is expressed as $W_n^{\{S\}}=W_n(:,\{S\})$ where $W_n=(I-u_n u_n^H)/(u_n^H u_n)$, n is the codebook index, S is the column index, I is the identity matrix, and $u_n^H$ the Hermitian matrix of $u_n$. For each uplink, a UE may provide a PMI and a rank indication (RI) in the channel-state-information (CSI) reports. The RI provides a recommendation on the number of layers that should preferably be used for downlink transmission to the terminal. The PMI indicates which of the precoder matrices should preferably be used for the downlink transmission. The reported precoder matrix is determined assuming the number of layers indicated by the RI. For LTE-A, the closed-loop codebook-based precoding may require cell-specific reference signals (CRS) for channel estimation, and there could be up to four antenna ports and a maximum of four layers. In the case of multi-antenna precoding the number of layers may also be referred to as the transmission rank.

A typical closed-loop Precoding Matrix Indicator (PMI) feedback mechanism can be described as an eNB selecting a PMI from a codebook to compensate for the downlink channel condition during a downlink to a UE. The UE then transmits back a PMI recommendation to the eNB by based on the channel condition for that particular instant. The PMI could then point to a precoding matrix in the codebook which contains an amplitude and phase adjustment distributed across each antenna for each layer of data streams. However, it should be noted that a PMI set of 16 is represented by four bits. However, under some circumstances, a full set of 16 PMIs might not be needed as the set may be reduced further and be represented by fewer bits. The present disclosure is premised upon the characteristics of channel temporal correlation in slowly-varying fading channels.

For example, when a mobile user stays indoors or walks outside, channel variation experienced by the UE 150, 151 of the mobile user could be slow. Under the coordinated multi-point (CoMP) scenarios, a typical UE 150 moves slowly, and thus the channel most likely changes slowly and is correlated in time. The optimum precoder could be designed using singular value decomposition (SVD) based on the instantaneous channels, and thus, channel variation will result in a change of the optimum precoder. If a fading channel changes gradually, then the corresponding optimum precoder is expected to also change gradually. Based on these assumptions, a bit-adaptive PMI feedback mechanism in a fixed codebook is proposed. The current PMI feedback mechanism in standard LTE-A transmits a fixed number of bits for PMI based on a fixed codebook. In low-mobility cases however, the number of feedback bits may be reduced further at the cost of limited performance loss.

In one of the exemplary embodiments of the present disclosure, the number of feedback bits could be reduced with a fixed number of bits and could be implemented as follows. First, a precoder candidate set is predefined for each precoder. That is to say each precoder index in a given codebook would point to a precoder candidate set, which is a set of precoder indexes to be used for the next transmission. The codebook and the precoder candidate set could all be designed offline. In other words, the precoder candidate to be selected for the next transmission is one of a subset of precoder indexes in a given codebook. Based on the predefined precoder candidate sets, a precoder transition protocol can be defined as follows. The precoder for the next transmission is determined based on the currently selected precoder (e.g. a reference precoder). In other words, a precoder to be selected for the following transmission refers to the previous precoder selected before, and the previous precoder could be the precoder recommended by a UE or could be the precoder selected by an eNB. For each currently selected precoder (e.g. reference precoder), the precoder candidate set for the following transmission could be predefined offline. The next precoder would be changed to one of the precoders out of the precoder candidate set predefined based on each current precoder (e.g. reference precoder). The process is then repeated. Thus a PMI feedback mechanism has been established. Take LTE-A for example, FIG. 2 contains the codebook with 16 precoders in LTE-A. Since there are 16 precoders in a codebook, the number of feedback bits is 4 for all layers. Consider the case that the number of layers is one. If the number of PMI feedback bits is to be reduced to 3 bits, the precoder candidate set for each precoder would only have 8 precoders.

Figure 3:
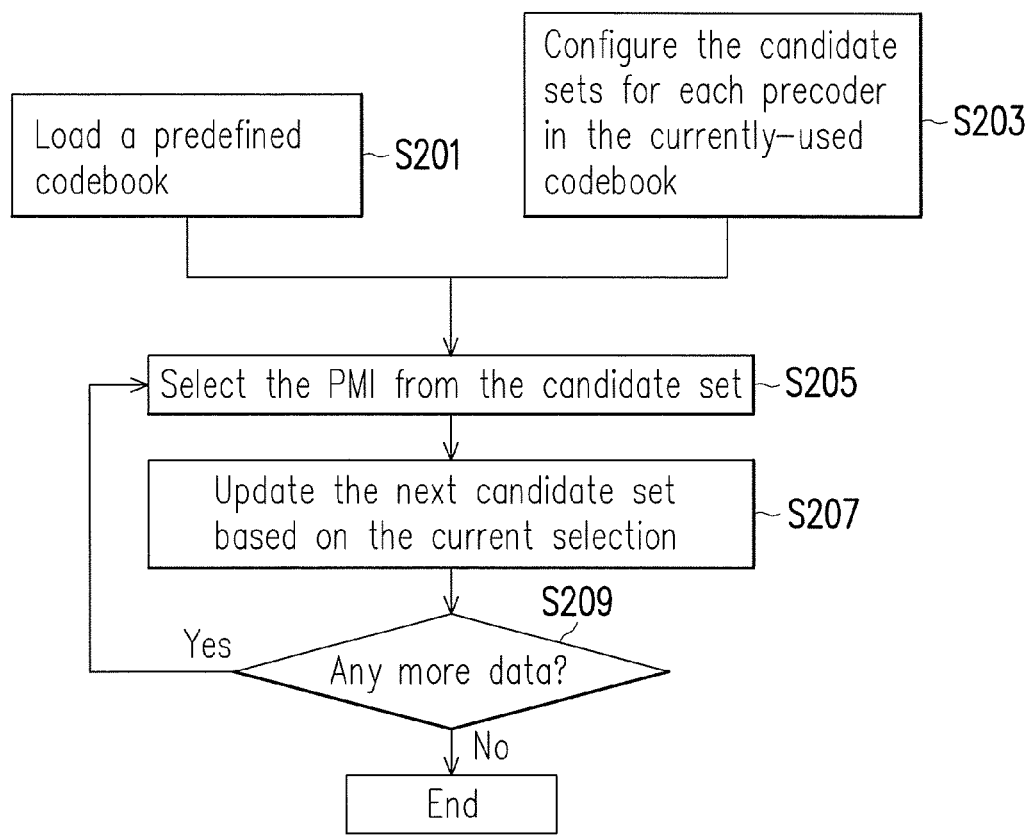
FIG. 3 illustrates the overall precoder transition procedure in accordance with one of the exemplary embodiments of the present disclosure.

Concept of bit reduction would be elucidated using a specific example. FIG. 3 illustrates the overall precoder transition procedure in accordance with one of the exemplary embodiments of the present disclosure. FIG. 4A illustrates a candidate set table listing uniform precoder candidates for each precoder in a codebook of LTE-A with the number of layers set to one in accordance with one of the exemplary embodiments of the present disclosure. Please refer to FIGS. 3 and 4A together.

In step S201, a predefined codebook has been loaded for downlink. The predefined codebook could be the standard codebook used for LTE-A from FIG. 2. $W_i$ could be defined as the i-th precoder in this codebook, where i=0, 1, . . . , 15. The timing of the first PMI feedback could be denoted by $t=t_1$, and the number of PMI feedback bits could be set to 4. That is to say, the precoder could be selected from all 16 precoders for the first time.

In step S203, for each precoder which is referred to by the index of the codebook, or PMI, a candidate set is predefined for the next transmission. It should be noted that the predefining could be preformed offline. For instance, the column 401 of FIG. 4A lists the current precoder indexes (e.g. reference precoder indexes) in column 401, and column 402 lists the candidate precoder indexes to be selected for the next transmission. If $W_0$ 403 would be chosen as the best precoder at time $t=t_1$ based on a selection criterion such as the maximum effective channel power, the precoder candidates at the next PMI report time $t=t_1+\Delta t_{PMI}$ would then be the set of {0, 9, 11, 4, 7, 12, 13, 14} 404 that is designed for $W_0$ 403, where $\Delta t_{PMI}$ is the period of PMI report. That means that the best precoder for the next transmission could only be selected from the precoder candidate set 404 based on $W_0$ 403 to report PMI. The precoders beyond this candidate set 404 for $W_0$ 403 would be prohibited. Since each precoder candidate set has only 8 elements, the system would only feed back 3 bits to represent the PMI, and thus overhead used for PMI reporting could be reduced.

In step S205, for the following transmission, one of the precoders from the candidate set would be selected. If $W_9$ 405 is selected as the best precoder at time $t=t_1+\Delta t_{PMI}$ in step S205, then in step 207, the precoder candidate set gets updated based on the selection of $W_9$ 405 and becomes the set of {9, 0, 2, 4, 5, 12, 13, 14} 406 which is designed for $W_9$ at time $t=t_1+2\cdot\Delta t_{PMI}$. Then $W_2$ could be selected from the candidate set 406 as the best precoder at time $t=t_1+2\cdot\Delta t_{PMI}$. In step S209, this process is repeated during the communication period. Thus, the next selected precoder must belong to the precoder candidate set of the current selected precoder (e.g. reference precoder).

The current selected precoder (e.g. reference precoder) may be the corresponding PMI fed back by a user equipment (UE) or the one used by an eNB. The proposed method could involve two cases: (1) At time $t=t_1+n\times\Delta t_{PMI}$, the feedback PMI belongs to the precoder candidate set of $W_i$, where i is the PMI fed back by a UE at time $t=t_1$, n is an integer, and $\Delta t_{PMI}$ is the PMI report period. (2) At time $t=t_1+n\times\Delta t_{PMI}$, the feedback PMI belongs to the precoder candidate set of $W_1$ which is the precoder used by an eNB at time $t=t_1$. In other words, the next precoder could be selected according to two possibilities. For the first possibility, the next precoder is selected based on the previous precoder recommended by the UE; and for the second possibility, the next precoder is selected based on the previous precoder used by the eNB. Both the previous precoder recommended by the UE and the precoder used by the eNB could be the reference precoder. In the first and the second possibility, the PMI selected by the eNB could be the same or different from the PMI recommended by the UE. Here, n is an integer, and $\Delta t_{PMI}$ is the PMI report period. The 8 elements could be encoded by 3 bits. In comparison with the original number of feedback bits of 4, the feedback overhead reduction ratio is 1/4 (25%) in comparison to the original method.

FIG. 4B illustrates a three-bits mapping table for each precoder candidate set in accordance with the exemplary embodiment of FIG. 4A. The candidate set for each precoder could be derived from a distance measuring function between code words which would later be explained. The bit mapping table assigns the PMI bit sequence to each precoder in the precoder candidate set according to the principle of one to one mapping. The row of precoder indexes numbered from 0 to 15 (411) could represent the current precoder index (e.g. reference precoder index) to be selected at time $t=t_1$. If the index number 15 (412) is chosen at time $t=t_1$, then the candidate set for the next transmission could only be the set {15, 4, 7, 0, 1, 2, 3, 8} 413. The column 410 represents the feedback bits for PMI. If the bit sequence 011 (414) is selected at time $t=t_1+\Delta t_{PMI}$, then this means that the index number selected from the set 413 is 0 (415). At time $t=t_1+2\cdot\Delta t_{PMI}$, the index could then be chosen among the set {0, 9, 11, 4, 7, 12, 13, 14}, and the process repeats.

It should be noted that although the PMI contained in the channel state information report is fed back by the UE, the selection is only a recommendation as the actual selection is done by an eNB. Also it should be noted that the eNB must know in what way the bits 410 would be mapped to the next index based on the current index (e.g. reference index). This means that both the UE and the eNB must contain the bit mapping table which could be designed offline and stored in the memory of a UE and eNB.

The number of feedback bits could also be set to 1 or 2 bits. FIG. 4C illustrates a two-bits mapping table for each precoder candidate set in accordance with one of the exemplary embodiments of the present disclosure. FIG. 4D illustrates a one-bit mapping table for each precoder candidate set in accordance with one of the exemplary embodiments of the present disclosure. The index transition protocols for the one-bit and the two-bit embodiments are similar in comparison to that for the three-bit embodiment and apparent a person of ordinarily skilled in the art and therefore will not be repeated.

Figure 5A:
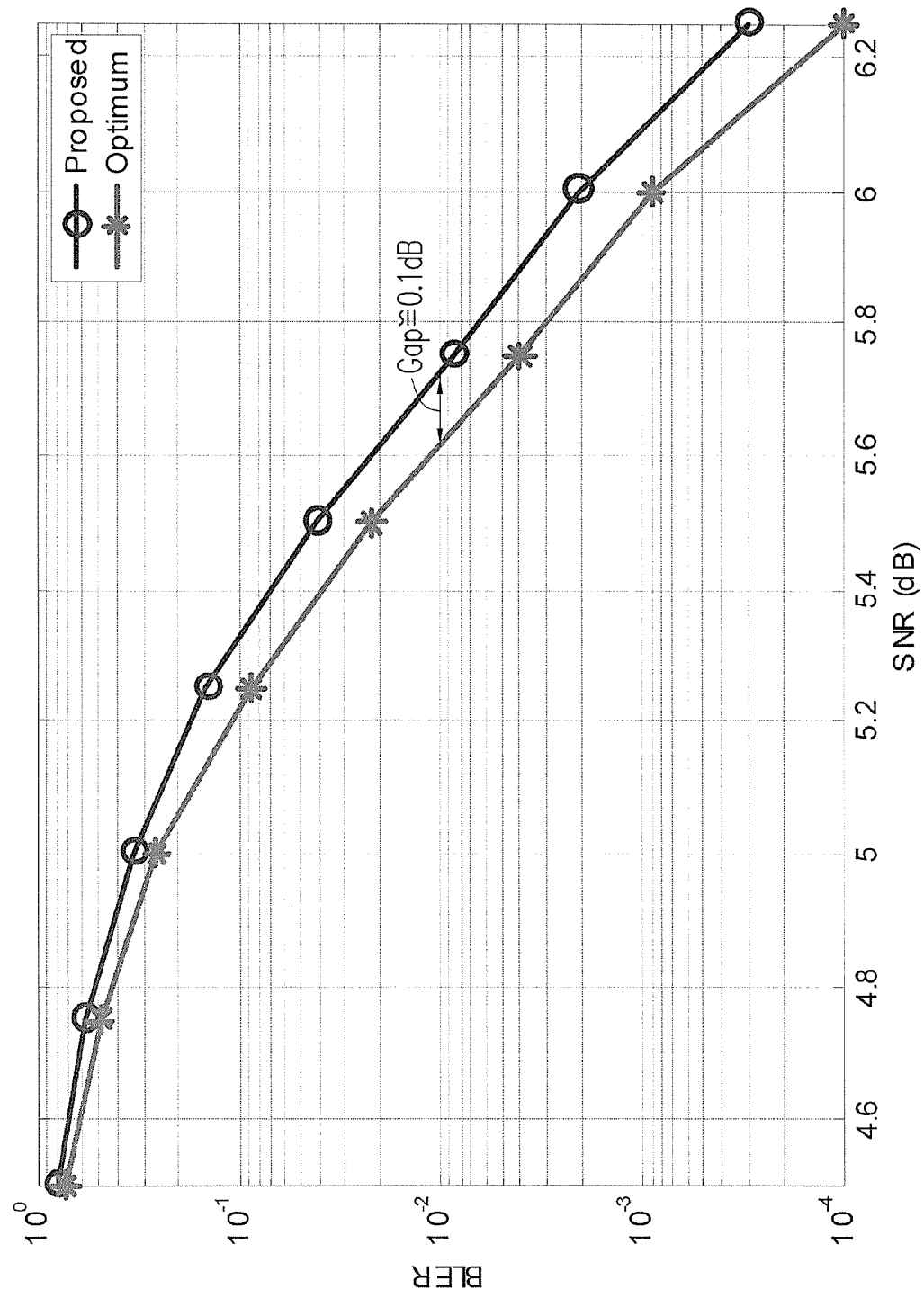
FIG. 5A illustrates the performance comparison between the original 4-bit PMI feedback method and the proposed 3-bit feedback method for the one-layer configuration.

In FIG. 5A, the simulation result is presented for the original 4-bit PMI feedback method (optimum) and the proposed 3-bit feedback method (proposed) in the one-layer configuration. The simulation parameters are listed as follows. The number of transmit antennas is 4 and the number of received antennas is 4. The simulated mobility speed is 5 km/h, the carrier frequency is 700 MHz, modulation adopts 64-QAM, and the PMI report period is 10 ms. The receiver structure is maximum ratio combining (MRC) and the precoder selection criterion is as follows:

$$W_{opt}=\arg\max_{P\in S_i}\{\|HP\|_2\},$$

where $S_i$ is the precoder candidate set for $W_i$. Please note that this selection criterion maximizes the power of the effective channel (combination of the fading channel and the selected precoder). From FIG. 5A, the performance loss is limited to 0.1 dB for block error rate (BLER)=0.01. At the cost of the limited performance loss, a feedback reduction ratio that is up to 25% could be obtained. Therefore, there is a trade-off between performance and feedback overhead.

Figure 5B:
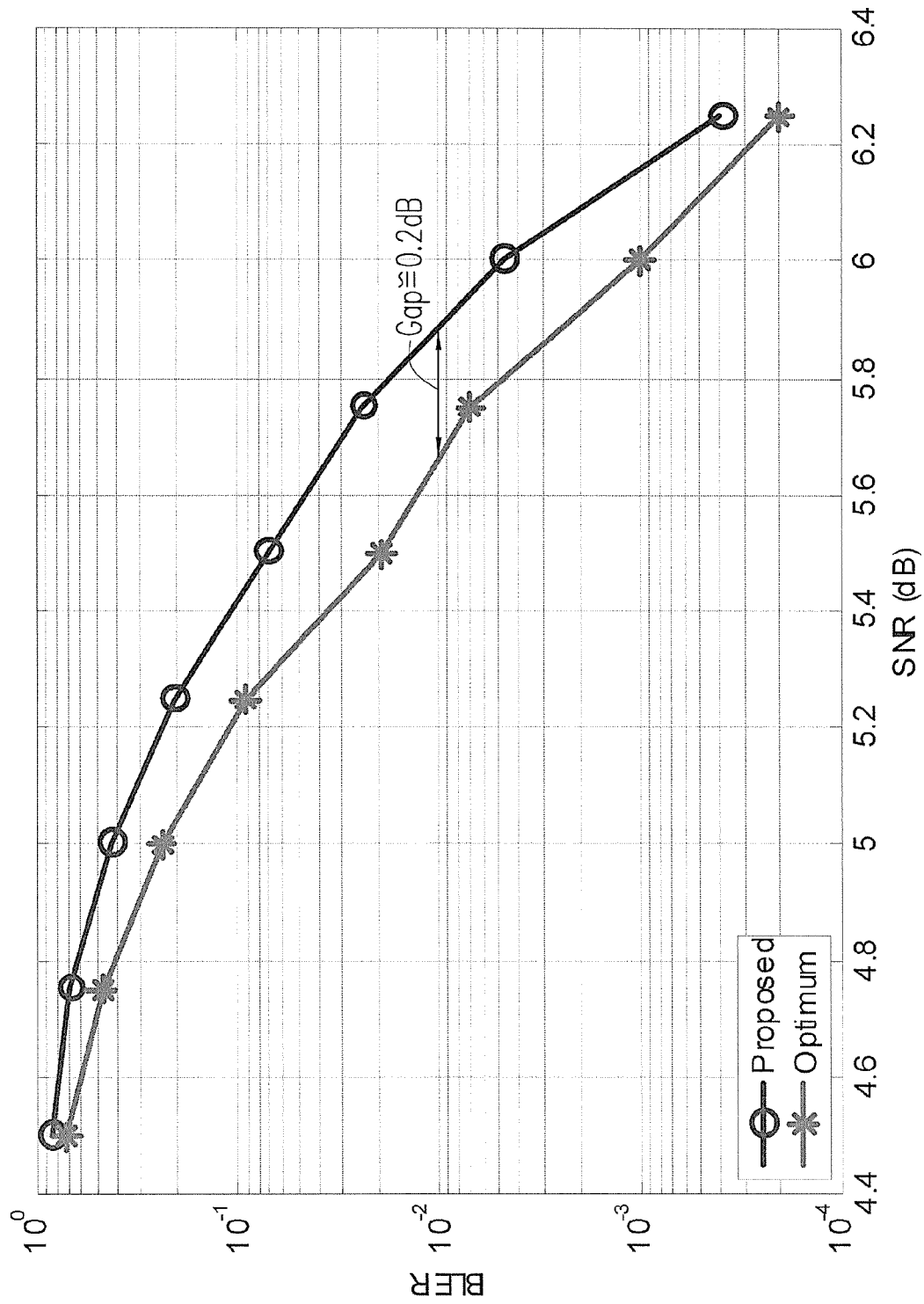
FIG. 5B illustrates the performance comparison between the original 4-bit PMI feedback method and the proposed 3-bit feedback method for the one-layer configuration with another set of parameters.

To further verify the performance of the proposed method, another simulation with mobility speed=20 km/h is performed. Other parameters are the same as those in FIG. 5A. The simulation result is shown in FIG. 5B. In this figure, the performance loss is within 0.2 dB for BLER=0.01, and the performance loss becomes a little larger than that in FIG. 5A. Since the mobility speed increases and the channel variation become larger, the selected precoder in the predefined precoder candidate set may not match the channel very well. Thus, the performance loss becomes a little larger.

Although the loss becomes larger, we still have the same feedback overhead reduction ratio (25%).

In the following, how to define the precoder candidate set for each precoder in a given codebook is explained. In this disclosure, the precoder candidates are selected from a given codebook using a distance measure function (or other distance-related measure functions like matrix correlation). For the one-layer configuration, the following formula is used:

$$d(W_1, W_2) = \sqrt{1 - |W_1^H W_2|^2}.$$

For more than 2 layers, these following choices could be used:

$$d(W_1, W_2) = \frac{1}{\sqrt{2}} \|W_1 W_1^H - W_2 W_2^H\|_F, \text{ or}$$

$$d(W_1, W_2) = \frac{1}{\sqrt{2}} \|W_1 W_1^H - W_2 W_2^H\|_2, \text{ or}$$

$$d(W_1, W_2) = \cos^{-1}(|\det(W_1^H W_2)|),$$

where $(\cdot)^H$ means conjugate transpose, $\|\cdot\|_F$ denotes the Frobenius norm, and $\|\cdot\|_2$ denotes matrix 2 norm. Please note that the power of each column in the precoding matrix $W_i$ would be normalized to one. The one-layer configuration could be used as an example to explain how to select the precoder candidates for each precoder. As for multi-layers, the same procedure could also be applied. First the distances between all precoders and a selected precoder, say $W_0$, are calculated. The distances are calculated as follows:

$$d_{0,i}(W_0, W_i) = \sqrt{1 - |W_1^H W_2|^2} \text{ for } i=0,1,\ldots,15,$$

where $d_{0,i}(W_0, W_i)$ means the distance between $W_0$ and $W_i$. Second, all the distances $d_{0,i}$ (i=0, 1, . . . , 15) from small to large are sorted. Finally, the desired precoder indices (8 precoders for 3 bits) are selected with the smallest distances or a mixture of precoders with small distance and large distance depending on the mobility speed.

Figure 6:
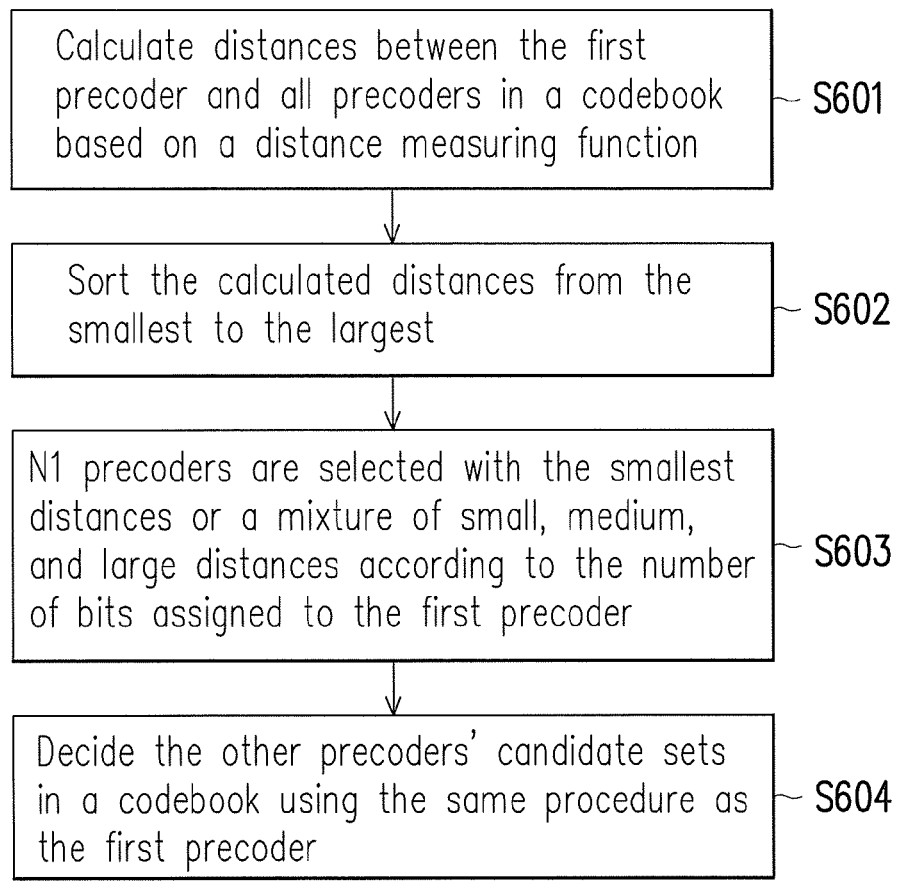
FIG. 6 illustrates the overall procedure of defining the precoder candidate set for each precoder in a given codebook based on a distance measuring function.

Please note that the precoder candidate set is a subset of precoders in a given codebook. Each precoder has its individual candidate set. The codebook size is neither shrunk nor expanded but is fixed as usual. All the precoders in a given codebook could be a candidate for selecting a PMI feedback at different PMI feedback timing. The selected precoder candidate sets with the 8 smallest-distance precoders are listed in FIGS. 4A and 4B. Therefore, FIG. 6 summarizes the procedure of forming the precoder candidate set, and in the procedure, the precoders in each precoder candidate set could be selected based on a distance measure function or distance-related measure function.

In step S601, for the first precoder, the distances between the first precoder and all precoders in a codebook based on a distance measure function are calculated. In step S602, the calculated distances from the smallest to the largest are sorted. In step S603, the $N_1$ precoders are selected with the smallest distances or a mixture of small, medium, and large distances according to the number of bits assigned to the first precoder (corresponding to $N_1$ elements). In step S604, for the other precoders in a codebook, the corresponding precoder candidate sets are decided as the procedure for the first precoder mentioned above.

In another exemplary embodiment, the feedback number of bits could be adaptively configured to be fixed or to vary. Here the constraint on the size of each precoder candidate set is relaxed as each precoder candidate set could contain a different number of precoders. Thus, the number of feedback bits at different PMI feedback time is variable or adaptive. For this embodiment, the proposed PMI feedback mechanism could provide a more flexible trade-off between the system performance and feedback overhead.

FIG. 7A illustrates an example of a non-uniform precoder candidates for each precoder in a codebook of LTE-A with the number of layers being set to one in accordance with one of the exemplary embodiments of the present disclosure. In this table, the precoder candidate sets for the even precoder indices of 0, 2, 4, . . . , 14 are all set to 3 bits and are selected by a mixture of smaller distance and larger distance. As to the precoder candidate sets for the odd precoder indices of 1, 3, 5, . . . , 15, the candidates are the all precoders in a given codebook. Therefore, if the current selected precoder index (e.g. reference precoder index) for PMI feedback at time $t=t_1$ is $W_0$ 701, then the next precoder candidates at time $t=t_1+\Delta t_{PMI}$ are $\{9, 4, 7, 12, 13, 15, 5, 6\}$ 702 that is designed for $W_0$ 701 and the number of feedback bits is 3. If the current selected precoder index (e.g. reference precoder index) for PMI feedback at time $t=t_1$ is $W_1$ 703, then the next precoder candidates at time $t=t_1+\Delta t_{PMI}$ are $\{0, 1, 2, \ldots, 15\}$ 704 and the number of feedback bits is 4. For example, the precoder transition order may be as follows: $W_0$ (3 bits) 701, $W_9$ (4 bits) 705, $W_1$ (4 bits) 703, $W_2$ (3 bits) 706, $W_4$ (3 bits) 707, $W_{11}$ (4 bits) 708, etc. The precoder is changed based on the defined candidate sets in FIG. 7A. Consequently, depending on the current selected precoder (e.g. reference precoder), the number of feedback bits for the next PMI report time is either 3 bits or 4 bits. Thus, the number of feedback bits is adaptive or variable.

Figure 7B:
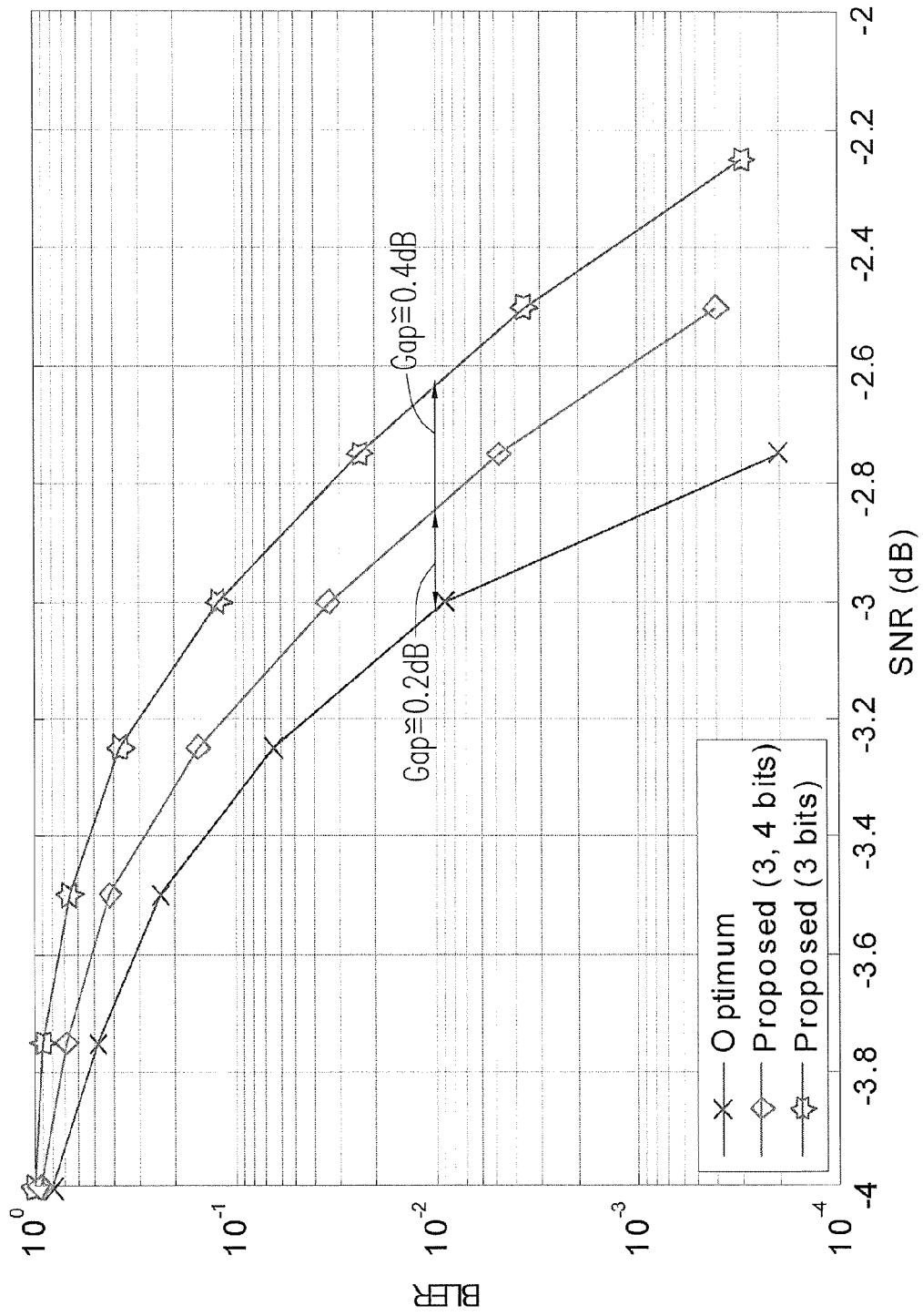
FIG. 7B illustrates performance comparison between the original 4-bit PMI feedback method and the proposed bit adaptive feedback method for the one-layer configuration.

For this embodiment, a simulation result is also provided in FIG. 7B, and the simulation parameters are listed as follows. The number of transmit antennas is 4 and the number of received antennas is 4. The simulated mobility speed is 30 km/h, the carrier frequency is 2 GHz, modulation adopts QPSK, and the PMI report period is 10 ms. FIG. 7B illustrates performance comparison between the original 4-bit PMI feedback method and the proposed bit adaptive feedback method. In FIG. 7B, the proposed adaptive feedback method with 3-bit PMI feedback behaves worse than the optimum (4-bit feedback) by 0.4 dB. This is because the carrier frequency has increased up to 2 GHz from 700 MHz and the mobility speed has increased up to 30 km/h. To compensate for this performance loss, the proposed non-uniform precoder candidate set could further improve the performance. The performance gap compared to the optimum method (4-bit feedback) is shortened to 0.2 dB. The probability that each precoder gets selected is assumed to be the same. In this case, since the number of feedback bits is 3 or 4 (probability is the same), the average number of feedback bits is 3.5 bits. Consequently, the reduced feedback overhead is around 0.5 bit and the overhead reduction ratio is about 12.5%. Although the overhead reduction ratio decreases from 25% to 12.5%, the performance gap could be further shortened. Clearly, a trade-off between performance and feedback overhead can be seen. Also any combination of 1, 2, 3, and 4 bits could be used for determining the precoder candidate sets as different combinations would result in different trade-offs between the system performance and the feedback overhead.

In summary, for the embodiment with bit adaptive feedback, the precoder candidate set defines a set of precoders for each precoder in a codebook. The precoder candidate set of each precoder is a subset of precoders in a codebook, but the number of precoders in each precoder candidate set could be different.

In another one of the exemplary embodiments, in order to further improve the system performance, the PMI feedback mechanism is implemented to be time flexible. More specifically, at a certain point in time for every predetermined period, the candidate set could be reset so that the candidate set could once again include all the precoders in a codebook. That means that the system could set a timer to return back to the original feedback mechanism to perform periodic global searching (PGS) with all four bits for PMI feedback. Thus, when a UE receives a signal which indicates a reset, the feedback PMI would indicate one of all precoder indices in a codebook. This function is designed to avoid losing tracking precoder variation (or the channel variation).

Figure 8:
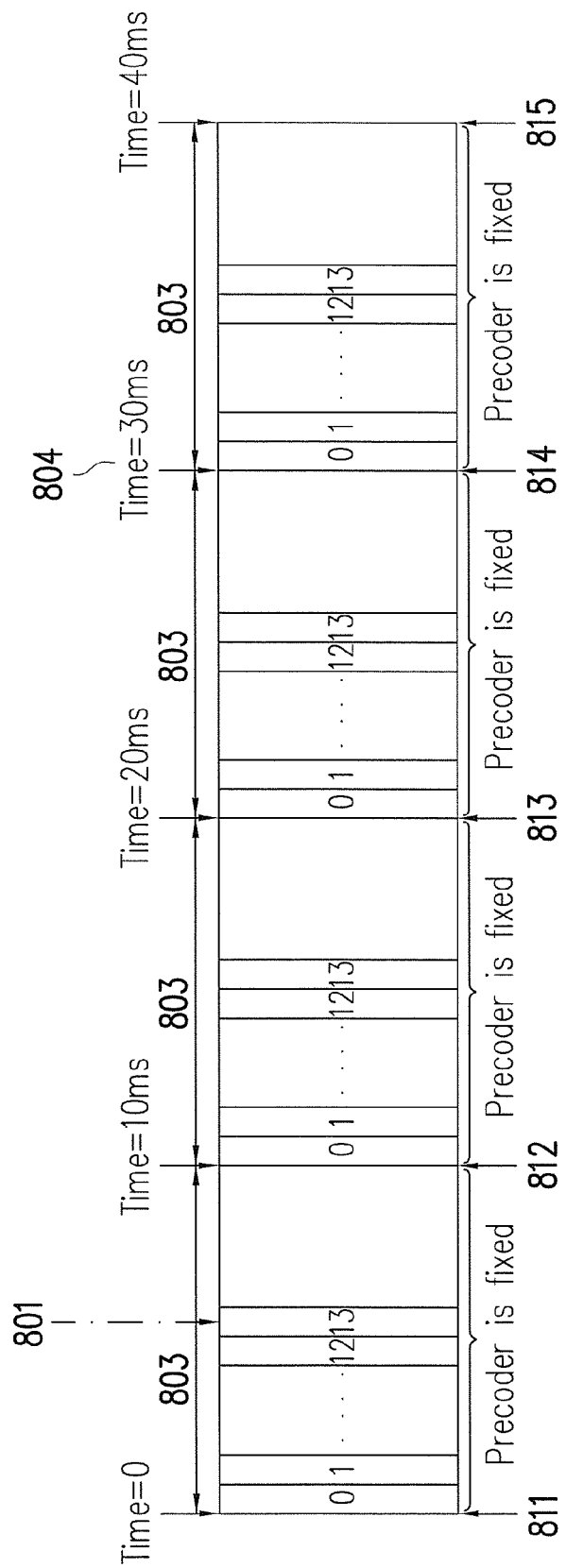
FIG. 8 illustrates a function of periodically globally searching (PGS) the best precoder to enhance performance.

The procedure is shown in detail in FIG. 8 which illustrates periodic global searching of the best precoder to enhance system performance. In FIG. 8, the number from 0 to 13 (801) indicates the range of OFDM symbol index in a resource block as the maximum number of OFDM symbols in a subframe is 14. Initially, the PMI points to the full codebook in time 811. Assuming that the PMI report period 803 is 10 ms, the candidate sets at time 812 and 813 would contain a subset of the codebook until the 30 ms mark (804) in which the PMI candidate set at time 814 would be reset to include all the precoders. This shows that for every 30 ms, the mechanism will be invoked to perform periodic global searching in order to maintain the system performance.

Figure 9:
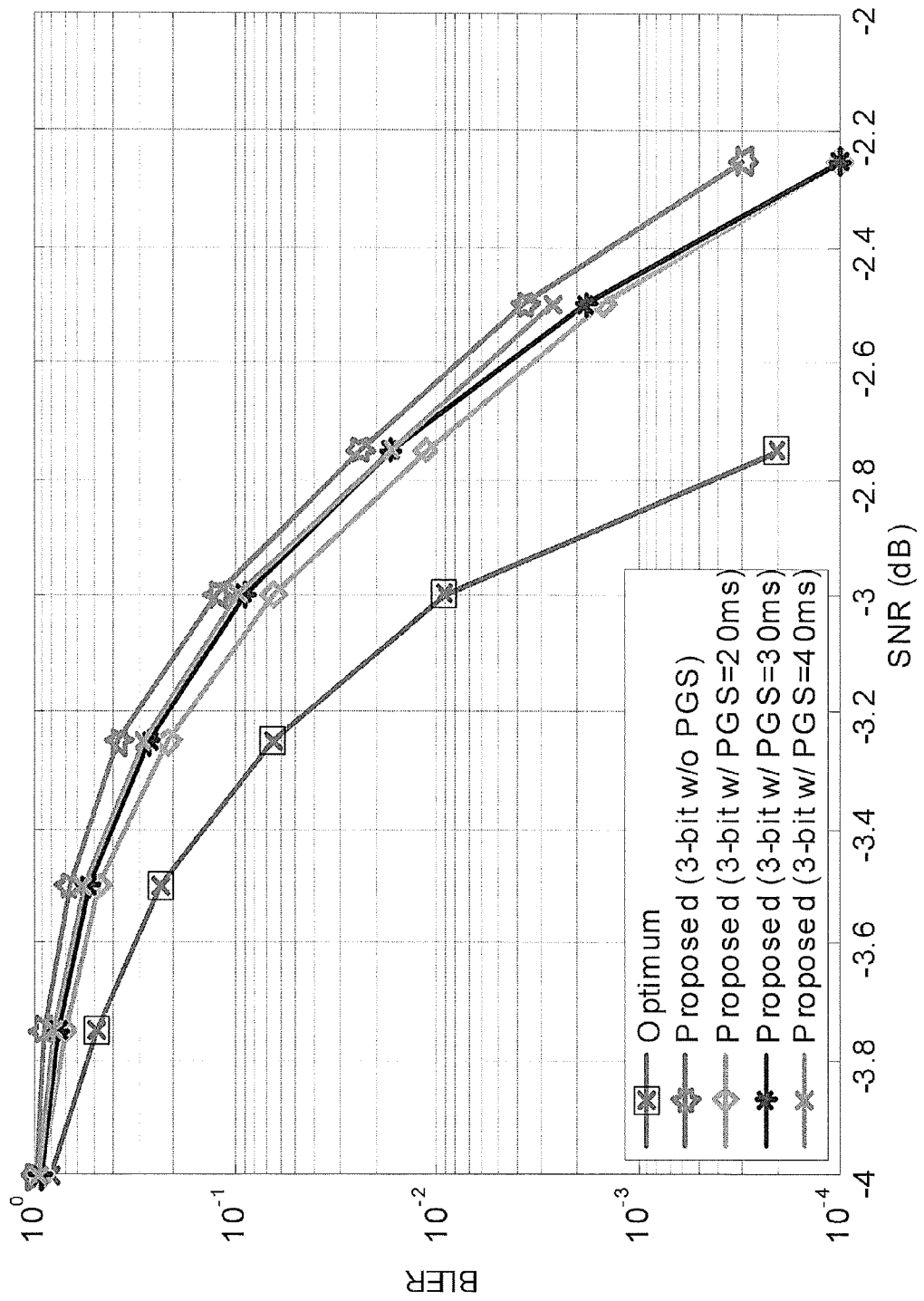
FIG. 9 illustrates a performance comparison between the original 4-bit PMI feedback method and the proposed PGS feedback method for the one-layer configuration.

For this embodiment, the simulation performance is shown in FIG. 9. The simulation parameters are listed as follows. The number of transmit antennas is 4 and the number of received antennas is 4. The simulated mobility speed is 30 km/h, the carrier frequency is 2 GHz, modulation adopts QPSK, and the PMI report period is 10 ms. The period of PGS is set to 20 ms, 30 ms, and 40 ms. The uniform 3-bit candidate sets for each precoder are listed in FIG. 10. In FIG. 9, a comparison between the BLER performance for the proposed method and the optimum method is made. It is evident that the performance is further improved in comparison to the proposed pure 3-bit feedback method without the PGS. The PGS technique is an alternative solution to further improve the performance of the proposed methods in all the previous embodiments. Thus, any of the embodiments could be combined to form a new PMI feedback mechanism. Therefore, it should be noted that the afore-aforementioned embodiments are merely exemplary as the present disclosure do not strictly fall under one of the three embodiments.

A UE could inform the serving eNB of changing the candidate set table if the performance is not satisfactory. One of possible methods is described as follows. The UE could count the number of NACKs fed back to the eNB to determine if the currently-used candidate set table has to be changed. If the number of NACKs for a certain packet is larger than $N_{nack}$, then the UE would transmit a signal to request the serving eNB to change the current candidate set table. Please note that $N_{nack}$ is a variable and is therefore changeable. The eNB also could transmit a signal to inform the UE of changing the currently-used candidate set table. The decision rule could be based on the above-mentioned approach. That is to say, if the number of NACKs for a certain packet is larger than $N_{nack}$, then the eNB would transmit a signal to inform the UE of changing the current candidate set table.

Signaling between eNBs and UEs could be implemented as follows. When an eNB decides to enter the reduced PMI feedback mode as proposed in this disclosure, an eNB would transmit a signal to a UE. After entering the reduced PMI feedback mode, an eNB would transmit a signal to inform a UE of the precoder candidate set configuration. The precoder candidate set configuration defines the precoder candidate set of each precoder in a codebook. The precoder candidate set of each precoder is a subset of precoders in a codebook. The number of precoders in each precoder candidate set could be the same or different. If an eNB decides to perform the PGS method, an eNB would transmit a signal to a UE including PGS period. When an eNB decides to return to the original PMI feedback mode, an eNB would transmit a fallback signal to a UE. Thus, signaling between eNBs and UEs would include information of entering the reduced PMI feedback mode, the PGS period, fallback to original PMI feedback mode, and the precoder candidate set configuration. Finally, a UE may feed back the PMI to an eNB.

Figure 11:
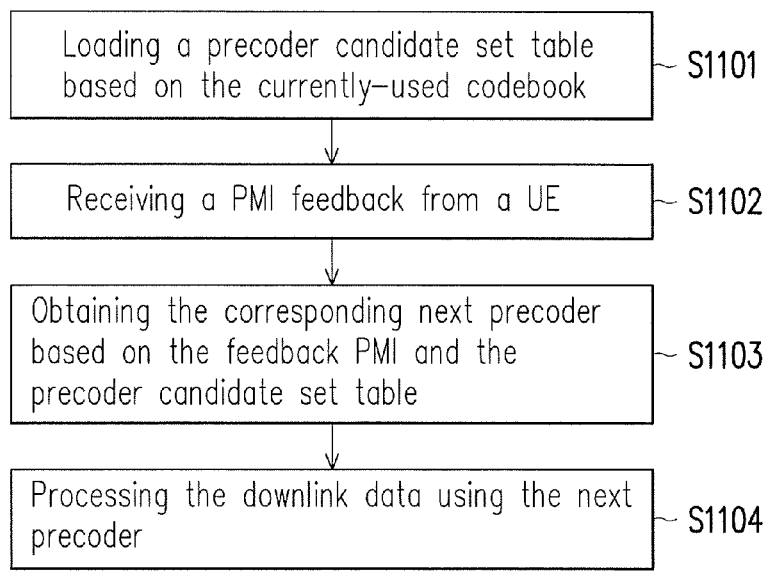
FIG. 11 summarizes the method for performing bit adaptive PMI feedbacks from an eNB's point of view.

FIG. 11 summarizes the method for performing bit adaptive PMI feedbacks from an eNB's point of view. In step S1101, the eNB configures precoder candidate set table based on the currently-used codebook, where the table defines a precoder candidate set for each of the precoder indexes of the codebook. It should be noted that the codebook is a standard codebook with fixed indexes. In step S1102, the eNB receives a PMI feedback from a UE. In step S1103, the eNB obtains from the precoder candidate set a next corresponding precoder as indicated by the feedback PMI. In step S1104, the eNB processes downlink data (i.e. performs precoding for the downlink streams) using the next precoder.

Figure 12:
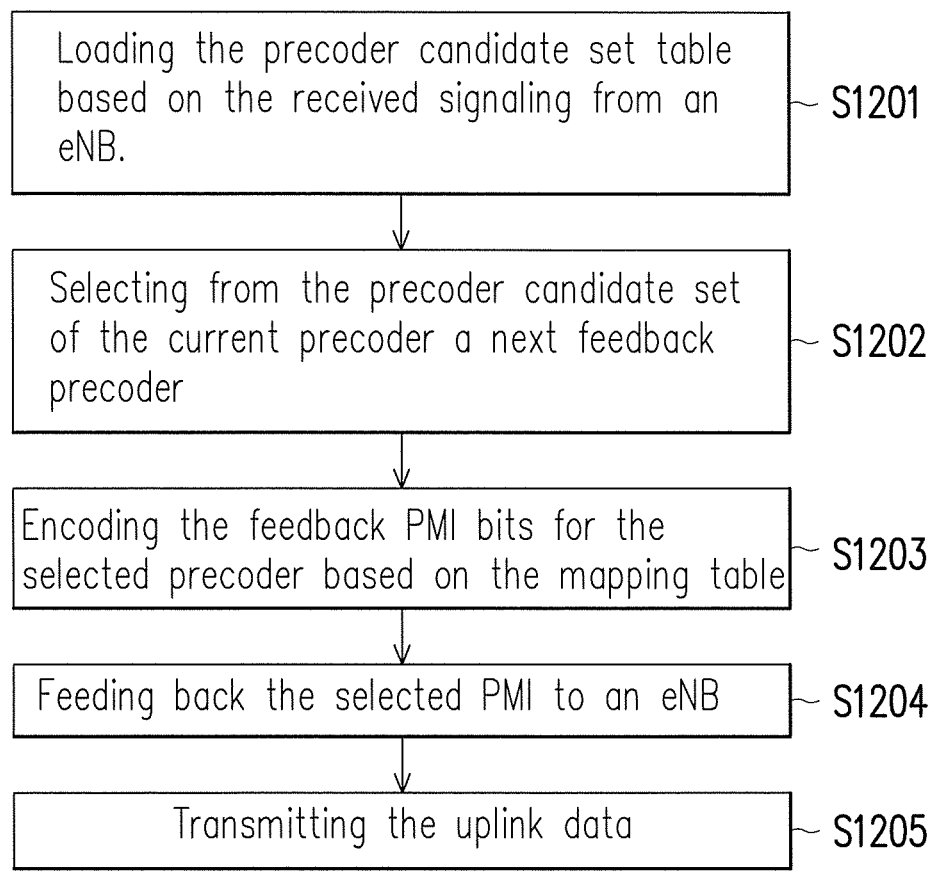
FIG. 12 summarizes the method for performing bit adaptive PMI feedbacks from a UE's point of view.

FIG. 12 summarizes the method for performing bit adaptive PMI feedbacks from a UE's point of view. In step S1201, the UE configures a precoder candidate set table based on the received signaling from an eNB, where the table defines a precoder candidate set for each of the precoder indexes of the codebook. Note that the setting of all precoder candidate sets in a UE is the same as that of an eNB. It should be noted that the codebook is a standard codebook with fixed indexes. In step S1202, the UE selects from the precoder candidate set of the current precoder (e.g. reference precoder) a next precoder to be fed back to an eNB. In step S1203, the UE encodes the feedback PMI bits for the selected precoder based on the bit mapping table. In step S1204, the UE feeds back the selected PMI to the eNB.

In view of the aforementioned descriptions, the present disclosure is able to reduce PMI feedback overhead by reducing the number of PMI feedback bits while maintaining reasonable system performance by using a time-varying subset of a standard codebook to implement the feedback, and the time-varying subset could be derived using a distance measuring function or other distance-related measure functions like matrix correlation, and feedback bits could be derived from a bit mapping table as the feedback bits could vary and be adaptable depending on external circumstances. The PMI feedback mechanism could also vary according to different time frames and go back to the original PMI feedback mode after every predetermined period. This disclosure could be applied to MIMO systems including single-user MIMO, multi-user MIMO, CoMP, and carrier aggregation (CA) scenarios to reduce the number of PMI feedback bits.

It will be apparent to those skilled in the art that various modifications and variations can be made to the structure of the disclosed embodiments without departing from the scope or spirit of the disclosure. In view of the foregoing, it is intended that the disclosure covers modifications and variations of this disclosure provided they fall within the scope of the following claims and their equivalents.

What is claimed is:

1. A method for performing bit adaptive precoding matrix indicator (PMI) feedbacks adapted for a user equipment (UE) having a fixed codebook with fixed precoder indexes with each precoder index pointing to a specific precoder, and the method comprising:
  selecting a first precoder based on a signal;
  mapping the first precoder into a first PMI bit sequence based on a bit mapping table and a reference PMI at least by:
  referring to the bit mapping table which comprises a candidate set table which predefines a candidate set of the next precoder, and each precoder of the candidate set of the next precoder is mapped to a specific bit sequence, wherein the specific bit sequence is used to map the each precoder in the precoder candidate set to a unique predefined bit sequence one to one; and
  converting from the first precoder into the first PMI bit sequence according to the bit mapping table;
  transmitting the first PMI bit sequence;
  receiving a first signal to enter a reduced PMI feedback mode, wherein the number of PMI feedback bits is to be reduced in the reduced PMI feedback mode;
  configuring the bit mapping table and the candidate set table after entering the reduced PMI feedback mode;
  monitoring the quantity of Non-Acknowledgement (NACK) signals transmitted; and
  if the transmitted quantity of NACK signals exceeds a first threshold, transmit a second signal to re-configure a new candidate set table and a new bit mapping table to request to change the candidate set table and the bit mapping table.

2. The method of claim 1, wherein the reference PMI is the previous PMI transmitted from the UE or is the previous PMI used by an eNB.

3. The method of claim 2 further comprising:
  selecting a second precoder based on another signal;
  mapping the second precoder into a second PMI bit sequence based on the bit mapping table and another reference PMI, wherein the another reference PMI is either the previous PMI transmitted from the UE or is the previous PMI used by the eNB; and
  transmitting the second PMI bit sequence.

4. The method of claim 1, wherein the first PMI bit sequence is among 1 to 4 bits.

5. The method of claim 1, wherein the quantity of bits of the first PMI bit sequence is variable.

6. The method of claim 1 further comprising:
  receiving a reset signal which resets a next precoder candidate set to all precoders of the fixed codebook.

7. The method of claim 1, wherein the candidate set table is derived according to selecting precoders for each precoder candidate set based on a distance measuring function or a distance-related measuring function.

8. An user equipment, comprising:
  a transceiver, for transmitting and receiving wireless data;
  a storage device, for storing at least a codebook with fixed precoder indexes with each precoder index pointing to a specific precoder and a bit mapping table; and
  a processing circuit, coupled to the transceiver and the storage device and is configured for:
  selecting a first precoder based on a signal;
  mapping the first precoder into a first PMI bit sequence based on the bit mapping table and a reference PMI at least by:
  referring to the bit mapping table, wherein the bit mapping table comprises a candidate set table which predefines a candidate set of the next precoder, and each precoder of the candidate set of the next precoder is mapped to a specific bit sequence, wherein the specific bit sequence is used to map the each precoder in the precoder candidate set to a unique predefined bit sequence one to one; and
  converting from the first precoder into the first PMI bit sequence according to the bit mapping table;
  transmitting, via the transceiver, the first PMI bit sequence;
  receiving, via the transceiver, a first signal to enter a reduced PMI feedback mode, wherein the number of PMI feedback bits is to be reduced in the reduced PMI feedback mode;
  configuring the bit mapping table and the candidate set table after entering the reduced PMI feedback mode;
  monitoring the quantity of Non-Acknowledgement (NACK) signals transmitted; and
  if the transmitted quantity of NACK signals exceeds a first threshold, transmit, via the transceiver, a second signal to re-configure a new candidate set table and a new bit mapping table to request to change the candidate set table and the bit mapping table.

* * * * *